United States Patent
Chunduri et al.

(10) Patent No.: US 8,934,490 B2
(45) Date of Patent: Jan. 13, 2015

(54) ACCELERATED MAC ADDRESS RESOLUTION FOR IPV6 TRAFFIC WITH IS-IS PROTOCOL

(71) Applicant: Telefonaktiebolaget L M Ericsson (Publ), Stockholm (SE)

(72) Inventors: Uma S. Chunduri, Fremont, CA (US); Wenhu Lu, San Jose, CA (US); Ing-Wher Chen, McLean, VA (US); Vasant Patil, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 180 days.

(21) Appl. No.: 13/852,871

(22) Filed: Mar. 28, 2013

(65) Prior Publication Data

US 2014/0211800 A1    Jul. 31, 2014

Related U.S. Application Data

(60) Provisional application No. 61/759,239, filed on Jan. 31, 2013.

(51) Int. Cl.
| | | |
|---|---|---|
| *H04L 12/28* | (2006.01) | |
| *H04L 12/741* | (2013.01) | |
| *H04L 29/12* | (2006.01) | |
| *H04L 12/751* | (2013.01) | |
| *H04L 12/721* | (2013.01) | |
| *H04L 12/715* | (2013.01) | |

(52) U.S. Cl.
CPC ............ *H04L 45/745* (2013.01); *H04L 61/103* (2013.01); *H04L 45/02* (2013.01); *H04L 45/66* (2013.01); *H04L 45/04* (2013.01)
USPC .......................................... 370/392; 370/351

(58) Field of Classification Search
None
See application file for complete search history.

(56) References Cited

U.S. PATENT DOCUMENTS

| | | | |
|---|---|---|---|
| 7,499,445 B2 * | 3/2009 | Previdi et al. ................. | 370/351 |
| 2006/0072574 A1 * | 4/2006 | Akahane et al. ............. | 370/392 |

FOREIGN PATENT DOCUMENTS

| | | |
|---|---|---|
| WO | WO-2009088856 | 7/2009 |
| WO | WO-2012130083 | 10/2012 |

OTHER PUBLICATIONS

Callon, R. , "Use of OSI IS-IS for Routing in TCP/IP and Dual Environments", http://tools.ietf.org/rfc/rfc1195.txt; Dec. 1990; 80 pages.
Narten, T. , et al., "Neighbor Discovery for IP Version 6 (IPv6)", *Elevate Technologies*; Sep. 2007; 97 pages.
Przygienda, T. , et al., "M-ISIS: Multi Topology (MT) Routing in Intermediate Systems (IS-ISs)", *Juniper Networks*; Feb. 2008; 14 pages.
* cited by examiner

*Primary Examiner* — Afshawn Towfighi
(74) *Attorney, Agent, or Firm* — Blakely, Sokoloff, Taylor & Zafman, LLP

(57) ABSTRACT

A method is executed by a router for improved Intermediate System to Intermediate System (IS-IS) protocol and Neighbor Discovery (ND) protocol execution to avoid dropped data traffic caused by Media Access Control (MAC) address resolution for next hops of routes determined by the IS-IS protocol. An IS-IS adjacency is established between the router and a neighbor router over a link, where a MAC address for the neighbor router is received from the neighbor router. A routing information base (RIB) is updated to include the neighbor router as a next hop for at least one destination address by the IS-IS process. The MAC address of the neighbor router is provided to an ND process to update the RIB, a forwarding information base (FIB) or L2 forwarding table of at least one line card of the router to include the MAC address of the neighbor router in response to the providing of the MAC address to the ND process.

14 Claims, 5 Drawing Sheets

ACCELERATED MAC ADDRESS RESOLUTION FOR IPV6 TRAFFIC WITH IS-IS PROTOCOL

CROSS-REFERENCE TO RELATED APPLICATION

The present application claims priority from U.S. Provisional Patent Application No. 61/759,239, filed on Jan. 31, 2013.

FIELD OF THE INVENTION

Embodiments of the invention are related to the field of network processing. Specifically, the embodiments relate to Media Access Control address resolution and similar level 2 address resolution.

BACKGROUND

Intermediate System to Intermediate System (IS-IS) is a routing protocol utilized within an administrative domain of a wide area network, such routing protocols are referred to as interior gateway protocols. Each router in the network implementing IS-IS builds a database of the network topology by flooding link state information throughout the network. This database is referred to as the routing information base (RIB). The database determines routes and forwarding to reach destination Internet protocol IP addresses or IP address prefixes.

The neighbor discovery (ND) protocol is a link layer protocol used in connection with Internet protocol version 6 (IPv6) for discovery and auto-configuration of neighboring nodes on each link of a router. ND determines the Media Access Control (MAC) address for each neighboring node and other nodes in the network and can determine a mapping between these MAC addresses and IP addresses.

In some cases such as link flaps (momentary link outages or glitches) or link recovery IPv6 traffic drop can occur for the IPv6 routes computed by the IS-IS protocol, if the underlying MAC address is not resolved by the ND process. This traffic loss can diminish network efficiency and the loss of essential data that impacts the functioning of the source and destination of the traffic.

SUMMARY

A method is executed by a router for improved Intermediate System to Intermediate System (IS-IS) protocol and Neighbor Discovery (ND) protocol execution to avoid dropped data traffic caused by Media Access Control (MAC) address resolution for next hops of routes determined by the IS-IS protocol. The method includes establishing an IS-IS adjacency between the router and a neighbor router over a link by an IS-IS process, where a MAC address for the neighbor router is received from the neighbor router. A routing information base (RIB) for the router is updated to include the neighbor router as a next hop for at least one destination address by the IS-IS process. The MAC address of the neighbor router is provided to an ND process by the IS-IS process. The RIB or a forwarding information base (FIB) of the router is updated to include the MAC address of the neighbor router in response to the providing of the MAC address to the ND process thereby obviating a need for the ND process to obtain the MAC address of the neighbor router in response to received data traffic at the router having a next hop to the neighbor router.

A router executes a process for improved Intermediate System to Intermediate System (IS-IS) protocol and Neighbor Discovery (ND) protocol execution to avoid dropped data traffic caused by Media Access Control (MAC) address resolution for next hops of routes determined by the IS-IS protocol. The router includes at least one line card including a forwarding information base (FIB), the at least one line card configured to communicate over a link with a neighbor router. The router also includes a network processor coupled to the at least one line card. The network processor is configured to execute an IS-IS module and an ND module. The IS-IS module is configured to provide an IS-IS process to establish an IS-IS adjacency between the router and the neighbor router over the link, where a MAC address for the neighbor router is received from the neighbor router, the IS-IS process to update a routing information base (RIB) for the router to include the neighbor router as a next hop for at least one destination address, the IS-IS process to provide the MAC address of the neighbor router to an ND process. The ND module is configured to provide the ND process to update the RIB or the FIB of the router to include the MAC address of the neighbor router in response to the providing of the MAC address to the ND process thereby obviating a need for the ND process to obtain the MAC address of the neighbor router in response to received data traffic at the router having a next hop to the neighbor router.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
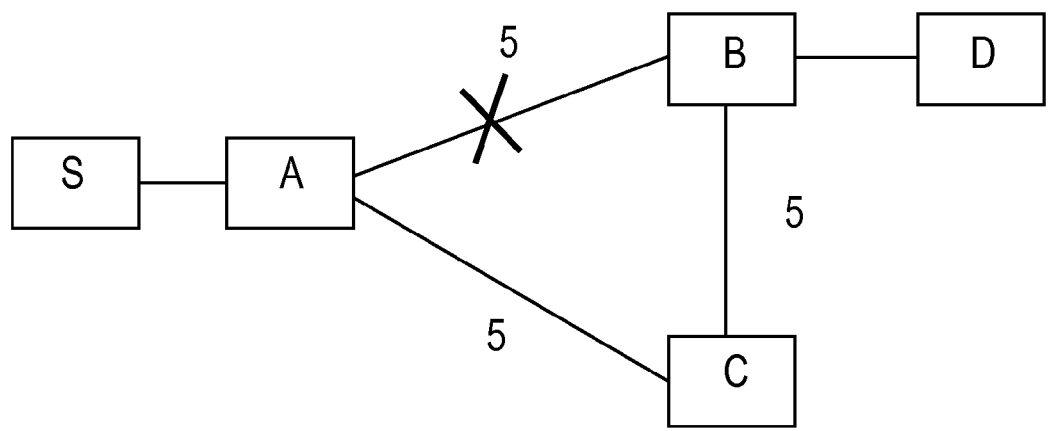
FIG. 1 is a diagram of one example embodiment of a network topology in which nodes implementing the IS-IS MAC resolution process are disposed.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The disadvantages of the prior art include router inefficiency caused by lost data traffic when a MAC address cannot be resolved in a timely fashion for the routes defined in the routing information base for incoming data traffic. The delay in MAC address resolution causes the data traffic to be dropped, which requires the data traffic be resent by the source thereby creating inefficiency in the router. These scenarios can occur in IPv6 deployments where IS-IS adjacency formation and route calculation is execute faster than the ND protocol address resolution process.

The embodiments overcome the disadvantages of the prior art by making use of the IS-IS knowledge of the MAC address, which is provided to the ND process to update the mapping in its MAC/neighbor tables. The MAC addresses learned in this manner are treated by the ND protocol as though they were learned by the standard ND protocol process. This process improves router forwarding efficiency by ensuring that MAC address are resolved regardless of the ND protocol load and conditions and any underlying link conditions such that no traffic is dropped for IS-IS routes that are installed in the FIB.

Overview

The networks and routers that do not implement the improved MAC address resolution processed described herein can lose data traffic and have inferior data traffic reliability and throughput as a result. After IS-IS adjacencies are established and routing database exchange between the nodes in a network occurs, IS-IS generates or maintains a routing information base (RIB) and downloads the calculated routes between the endpoints to a forwarding information base (FIB) in the line cards or similar forwarding elements of the router. When actual data traffic arrives subsequently at the router that hits any of the destinations with corresponding entries in the RIB/FIB, a next hop MAC entry would be looked up and returned for use in forwarding, specifically for framing the L2 header of the outbound data traffic. If there is no MAC address resolved for this next hop, then the ND protocol will be utilized to perform MAC address resolution. This works well, if the ND protocol resolves the MAC address in a timely fashion. However, if the ND protocol resolution process doesn't complete quick enough, then actual data traffic for the routes determined by IS-IS, but without next hop MAC addresses, will be dropped rather than forwarded. This traffic loss will continue until the ND protocol resolves the MAC address for this next hop that the IS-IS routes depend upon.

FIG. 1 is a diagram of one example embodiment of a network topology in which nodes implementing the IS-IS MAC resolution process are disposed. In the diagram, a source (S) node communicates with and is linked to a destination (D) node through a set of intermediate nodes (A,B,C). Each of these nodes, particularly the intermediate nodes, can be routers or similar network elements. The link between Router A and B, in the example, is initially down and traffic from the source (S) to the destination (D) is forwarded via router path A-C-B. When the link recovers between A and B, IS-IS adjacency is established between router A and B using IS-IS messages. After route computation (e.g., using Shortest Path First or similar routing algorithms), data traffic at router A that is headed for destination D will use next hop B, instead of a next hop of C. This causes all the data traffic headed to the destination D at router A to hit (i.e., be forwarded to) the new next hop router B. However, if the ND protocol doesn't resolve a MAC address entry for router B before this data traffic arrives at the router A, then all the data traffic destined for D will be dropped at the router A in the forwarding plane.

Figure 2:
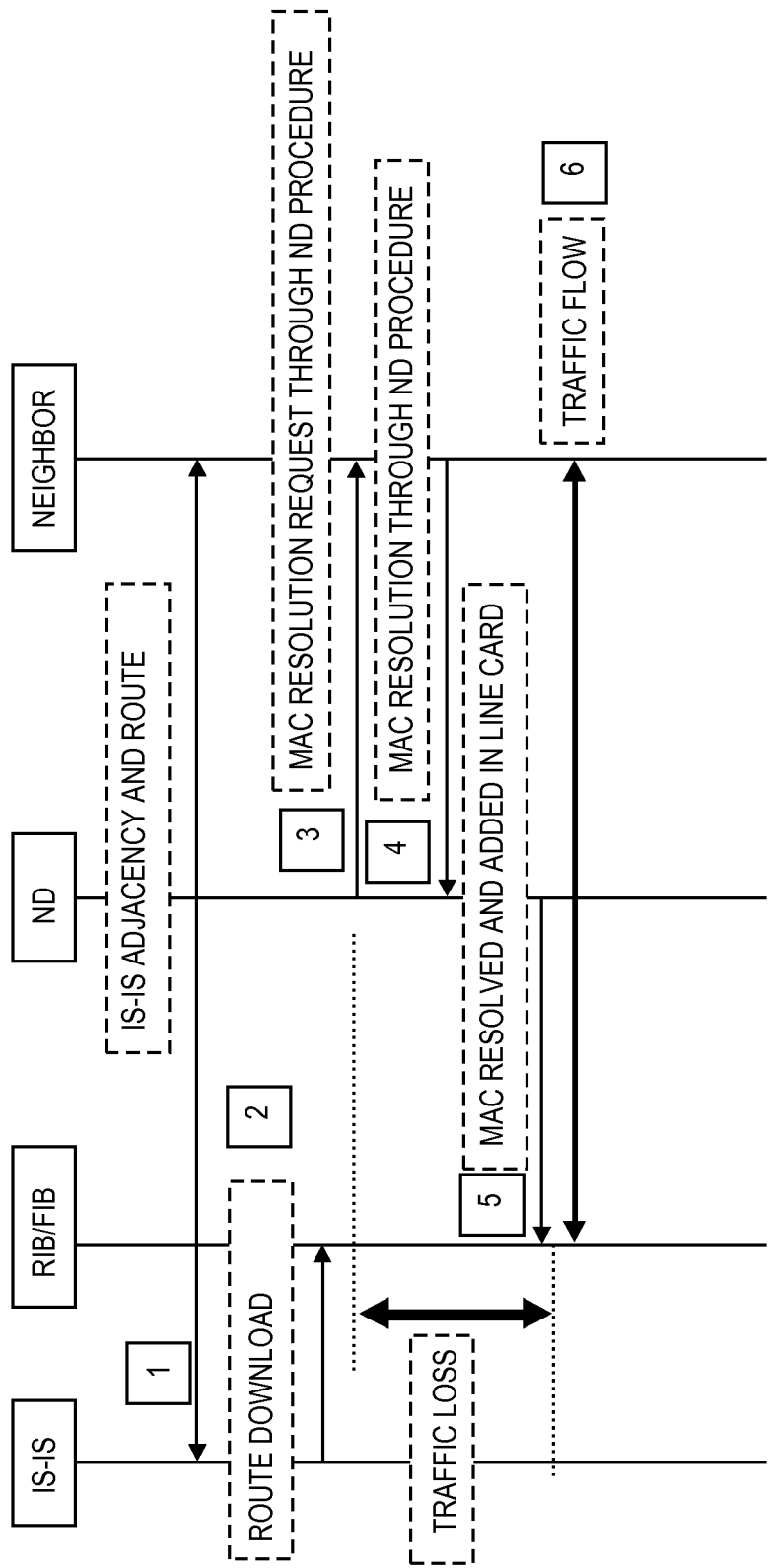
FIG. 2 is a diagram of one embodiment of MAC address resolution process showing the timing and actions taken by each component of the router.

FIG. 2 is a diagram of one embodiment of MAC address resolution process showing the timing and actions taken by each component of the router. The process utilizes MAC information known to the IS-IS process to assist the ND protocol in resolving MAC addresses in scenarios where the standard ND process is slower than IS-IS routing updates. Because the IS-IS process runs on Layer 2 directly, IS-IS knows the MAC address of the adjacent router when adjacency is established. To avoid traffic losses in the scenarios explained above, it is quicker for IS-IS to facilitate by providing the MAC address and the next hop's (neighbor's) interface link local address directly to the ND process. In this manner ND need not resolve the MAC addresses known by IS-IS and can take the MAC address directly from IS-IS and install the MAC address as an entry in its neighbor cache (MAC/neighbor table) and treat these sorts of entries as if they are learned by the normal ND procedures.

The diagram shows the behavior in the sequence of events as represented in cases where the embodiments of the present invention are not implemented. Each event is labeled with a number of their sequential order from 1 to 6. Data traffic loss can happen for the duration of time between the events 3 and 5.

The first event (1) in this sequence is the establishing of IS-IS Adjacency between the local router (i.e., the reference router executing the IS-IS protocol) and the neighboring router, which is also executing the IS-IS protocol. The illustrated process is simplified for sake of clarity to show a router forming an adjacency with a single neighboring router. However, one skilled in the art would understand that the router can establish adjacencies with any number of neighboring routers. The IS-IS protocol defines a set of messages and information that is exchanged between the router and the neighboring routers that is used to populate a routing information base that provides a model of the network topology for the router and to determine routes to each known destination within the network.

The second event (2) in the sequence is a route computation and installation. After the route computations by the routing protocol have completed, the computed routes are downloaded (i.e., stored) in the RIB and FIB. The next event (3) in the example sequence is the arrival of data traffic at the router. When actual data traffic hits for any of the destinations identified in the RIB and FIB, this causes the ND protocol to resolve the MAC address for the next hops to the neighbors identified by the RIB and FIB (e.g., using a neighbor solicitation (NS) message). The next event (4) is the ND protocol learning the MAC address of the next hop neighbor via ND procedure (e.g., via an NS Acknowledgement message). The time to receive the NS acknowledgement with the next hop neighbors MAC address can vary depending on the roundtrip time of the link and the load on the ND protocol at each end. The next event (5) is the population of the MAC address in a MAC to the routing data structures maintained by the router. In one embodiment, the ND protocol downloads (i.e., stores) the resolved MAC address to the RIB to be associated with the next hop for the destination, which in turn downloads to the line cards (i.e., the FIB used for forwarding by the line cards. In other embodiments, the ND protocol can directly or in parallel download the MAC address to both the RIB and the FIB or can similarly update these information bases. The sequence and mechanism for updating the RIB and FIB can have any implementation such that they are updated prior to the resumption of data traffic flow. The last illustrated event (6) is the resumption of data traffic flow forwarding for the destinations using the previously unresolved next hop.

It can be seen from the illustration that there would be a data traffic loss during the time of events 3 and 5. The actual time and amount of lost data traffic depends on how loaded (i.e., how heavy the backlog or load) the ND control plane process is and how quick the neighboring router responds to the ND request (i.e., how heavy the load on the neighbor's ND control plan process is). This time of data traffic loss may range from several 100 milliseconds to several seconds in real networks operating under normal conditions. Thus, the consequent amount of lost data traffic can be significant.

Figure 3:
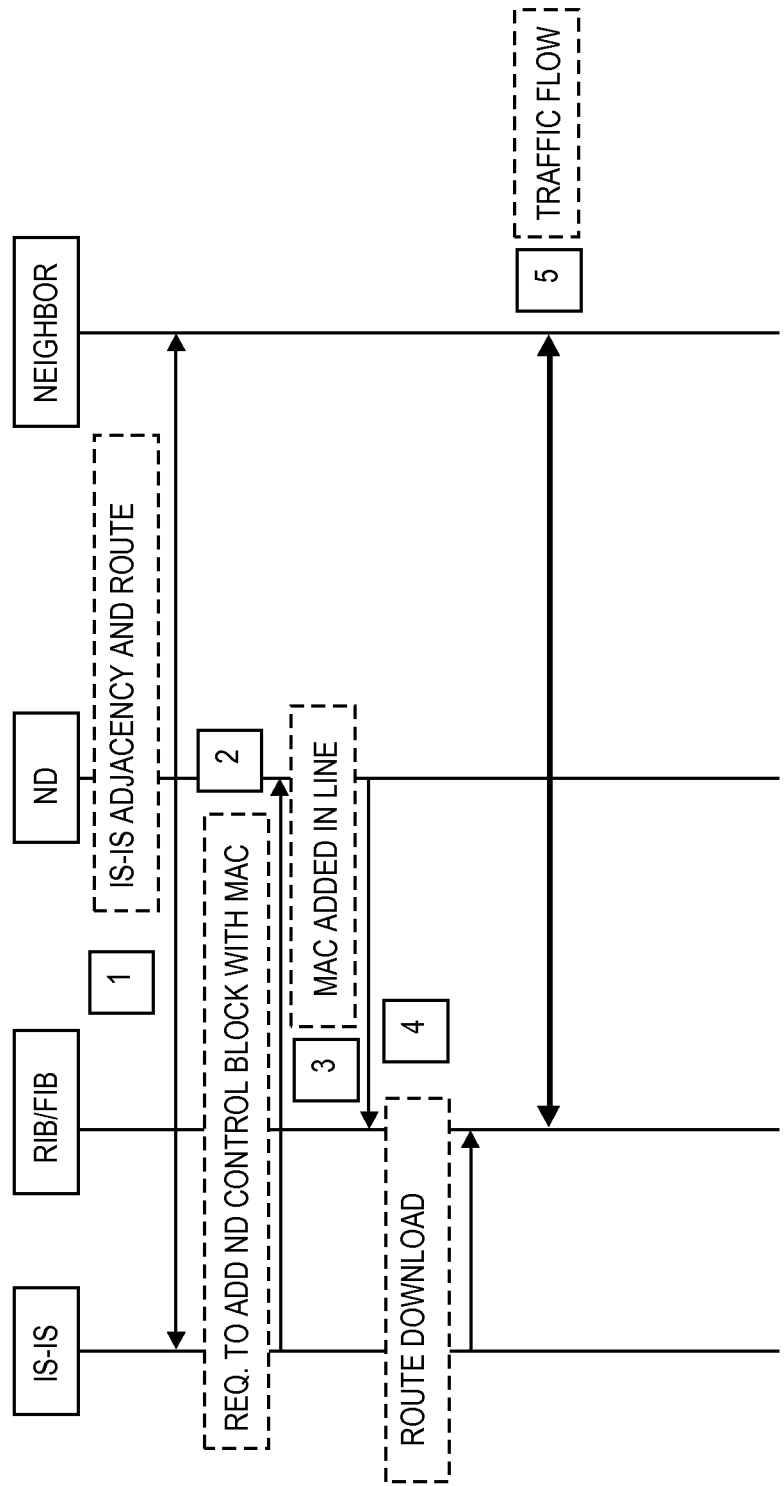
FIG. 3 is a diagram of one embodiment of MAC address resolution process showing the timing and actions taken by each component of the router.

FIG. 3 is a diagram of one embodiment of MAC address resolution process showing the timing and actions taken by each component of the router. The embodiments, take advantage of information obtained when adjacency is established via IS-IS with a neighbor router, the MAC address of the neighbor is known to IS-IS and does not have to be obtained using the ND protocol. The MAC address is directly sent to the ND process and the resolved MAC is programmed in the L2 forwarding tables of the line cards well before actual data traffic reaches the router (e.g., router A in the example above described in regard to FIG. 1).

The process is described with relation to sequence illustrated in FIG. 3, which illustrates a set of events 1 to 5. The first event (1) in the example sequence is the establishment of IS-IS Adjacency between local router (i.e., the reference router executing the IS-IS protocol) and a neighboring router, which is also executing the IS-IS protocol. The illustrated process is simplified for sake of clarity to show a router forming an adjacency with a single neighboring router. However, one skilled in the art would understand that the router can establish adjacencies with any number of neighboring routers. The IS-IS protocol defines a set of messages and information that is exchanged between the router and the neighboring routers that is used to populate a routing information base that provides a model of the network topology for the router and to determine routes to each known destination within the network. The information that is exchanged in establishing the IS-IS adjacency includes the MAC address of the neighbor router. After the MAC address of the neighbor router is received, the next event (2) is a request sent by the IS-IS process to the ND process to add a ND control block for the neighboring router's interface link local address and MAC address. The IS-IS process requests to add this ND control block via the ND process functions for maintaining ND control blocks. The next event (3) in the sequence, the ND process adds the MAC address in the RIB and FIB. These events 2 and 3 occur before or in parallel with event 4. Event 4 is the route computation by the IS-IS process, which when it is completed, the computed routes are downloaded to the RIB and FIB. When event 5, arrival of data traffic, occurs, there is no loss of the data traffic as all next hops of destinations in the RIB and FIB have corresponding MAC addresses resolved. Actual data traffic can hit for any of the destinations defined in the RIB and FIB and this results in actual data traffic flow without any delay. The IS-IS process can utilize any method to notify the ND of the MAC address of the adjacent nodes including generating standard ND messages already implemented for the ND protocol as well as using specialized methods and functions of the ND process provided to service information provided by IS-IS process. Standard messages can include message types utilized by line cards and other components to provide information to the ND for updating the RIB and FIB (e.g., neighbor caches, etc.). In this manner, the ND process implemented by the router does not need to be altered and can be utilized as-is.

Figure 4:
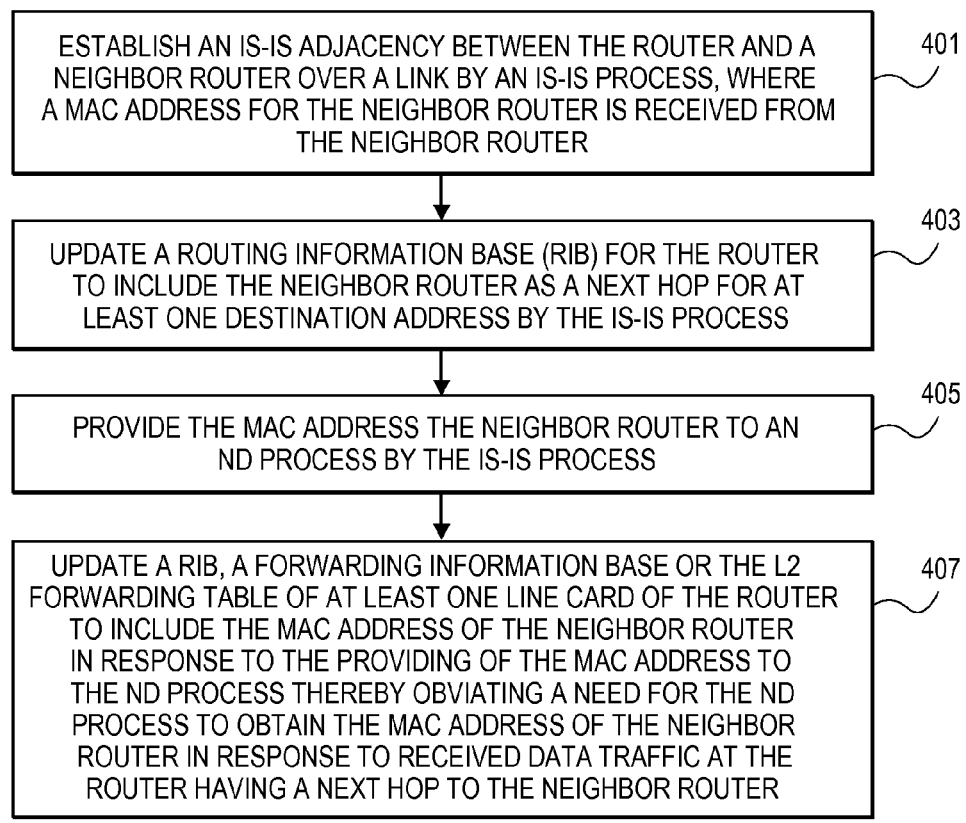
FIG. 4 is a flowchart of one embodiment of the process implemented by the router to provide the uninterrupted data traffic process using MAC addresses provided by the IS-IS process.

FIG. 4 is a flowchart of one embodiment of the process implemented by the router to provide the uninterrupted data traffic process using MAC addresses provided by the IS-IS process. In one embodiment, the method is executed by the router to improve Intermediate System to Intermediate System (IS-IS) protocol and Neighbor Discovery (ND) protocol execution by avoiding dropped data traffic caused by Media Access Control (MAC) address resolution for next hops of routes determined by the IS-IS protocol.

In one embodiment, the process can be initiated when establishing an IS-IS adjacency between the router and a neighbor router over a link by an IS-IS process (Block 401). In the process of establishing IS-IS adjacency information is exchanged between the two routers, including a MAC address for the neighboring router. Adjacency can be established anytime a new link is detected by the router or when a link becomes active after having been inactive. In example application of the process is in response to temporary link failure or inactivity that causes the router to remove the link and the neighboring router from the topology of the network that it maintains in the routing information base.

With adjacency established, the neighboring router and the link are added to the topology of the network known to the router. The router updates its routes to the known destination using any routing algorithm or process. This updating of the routes can include routes that traverse the newly added link and neighboring router. In this case, the routing information base (RIB) for the router is updated to include the neighbor router as a next hop for at least one destination address by the IS-IS process (Block 403). The IS-IS process provides the MAC address of the neighbor router to an ND process (Block 405). Providing the MAC address of the neighbor router to the ND process can be implemented in any number of manners. In one embodiment, the IS-IS process generates an ND message with the MAC address and forwards the ND message to the ND process. Any type of ND message can be utilized by the IS-IS process including a router advertisement, neighbor advertisement message or similar message. These messages can be processed by the ND process to add an ND control block. These embodiments enable the implementation of the improved MAC address resolution without requiring any significant or major change to the ND process.

In another embodiment, the IS IS process provides the MAC address of the neighbor router to the ND process by calling a function of the ND process to pass the MAC address of the neighbor router to the ND process as an argument. The function can be a specially added function to the ND process for receiving data including the MAC address from the IS-IS module. In other embodiments, an existing ND process or function is utilized by the IS-IS process to supply the MAC address to the ND process. The existing ND process or function may exist that enables external processes to pass information to the ND process or the process or function can be repurposed. These embodiments can involve the modification of the ND process to support the provision of the MAC address via the IS-IS process. In further embodiments, the IS-IS module can directly modify ND process data structures to effect the update.

In one embodiment, the RIB, a forwarding information base (FIB), and/or line card L2 forwarding tables of the router are updated by the ND process to include the MAC address of the neighbor router in response to the providing of the MAC address to the ND process by the IS-IS process (Block 407), thereby obviating a need for the ND process to obtain the MAC address of the neighbor router in response to received data traffic at the router having a next hop to the neighbor router. In one embodiment, the update of the FIB is performed by another process, such as a process dedicated to the update of the FIB in each line card to match or reflect the data of the RIB. Once the data has been updated to the FIB in each line card any traffic that arrives can be immediately processed as each destination will have a next hop with a resolved MAC address. Once the ND process obtains the MAC address from the IS-IS process and creates the entries in a cache entry in its cache table, updates the RIB, FIB or line card or similarly updates the router, the ND process treats the information as though the MAC was learned through the standard ND process, rather than from the IS-IS process.

Figure 5:
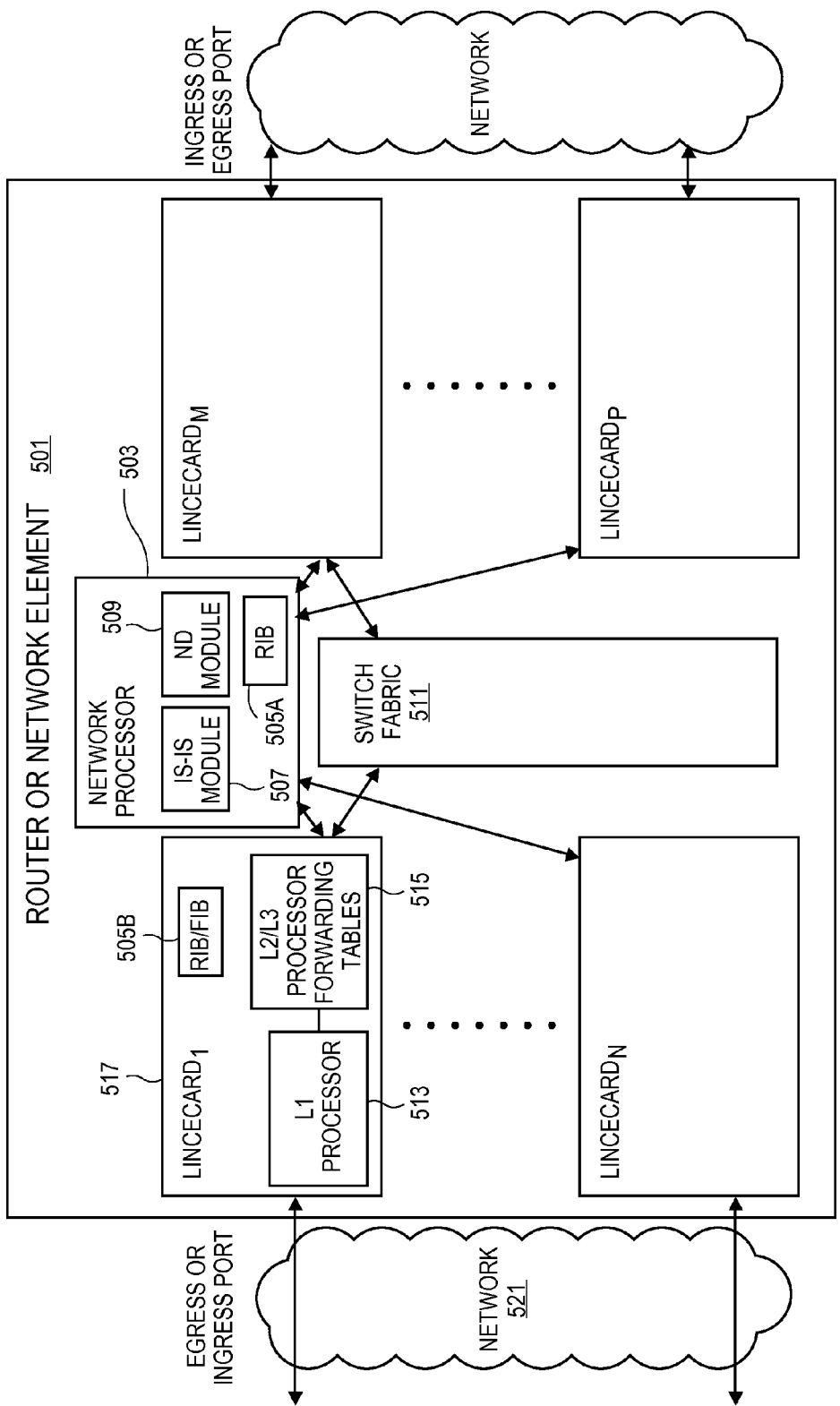
FIG. 5 is a diagram of one embodiment of a system executing an IS-IS module to generate an IS-IS process implementing the methods described herein.

FIG. 5 is a diagram of one embodiment of a system executing an IS-IS module to generate an IS-IS process implementing the methods described herein. In one embodiment, the process is implemented by a router 501 or network element or similar computing device. The router 501 can have any structure that enables it to receive data traffic and forward it toward its destination. The router 501 can include a network processor 503 or set of network processors that execute the functions of the router 501. A 'set,' as used herein, is any positive whole number of items including one item. The router 501 or network element can execute IS-IS process functionality via a network processor 503 or other components of the router 501. The router 501 can also execute an ND module 509 to generate an ND process that implements ND functions and maintain a routing information base (RIB) 505A.

The IS-IS process and ND process functions can be implemented as modules in any combination of software, including firmware, and hardware within the router. The functions of the IS-IS process and ND process that are executed and implemented by the router 501 include those described further herein above.

In one embodiment, the router 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement forwarding information base 505B, L1 processor 513, L2 processor 515 including L2 forwarding tables, or a relevant subset thereof. The L1 processor can process data traffic being received or transmitted at the physical layer (L1). The L2 processor can process data traffic being received or transmitted at the data link layer (L2). The line cards 517 can also implement or facilitate the IS-IS process and ND process functions described herein above. The line cards 517 are in communication with one another via a switch fabric 511 and communicate with other nodes over attached networks 521 using Ethernet, fiber optic or similar communication links and media.

In other embodiments, the processes can be implemented by a split-architecture node, where the control plane is remote from the data/forwarding plane. In this case, the IS-IS and ND processes can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a router for improved Intermediate System to Intermediate System (IS-IS) protocol and Neighbor Discovery (ND) protocol execution to avoid dropped data traffic caused by Media Access Control (MAC) address resolution for next hops of routes determined by the IS-IS protocol, the method comprising the steps of:
    establishing an IS-IS adjacency between the router and a neighbor router over a link by
        an IS-IS process, where a MAC address for the neighbor router is received from the neighbor router;
    updating a routing information base (RIB) for the router to include the neighbor router as a next hop for at least one destination address by the IS-IS process;
    providing the MAC address of the neighbor router to an ND process by the IS-IS process; and
    updating the RIB, a forwarding information base (FIB) or L2 forwarding table of at least one line card of the router to include the MAC address of the neighbor router in response to the providing of the MAC address to the ND process thereby obviating a need for the ND process to obtain the MAC address of the neighbor router in response to received data traffic at the router having a next hop to the neighbor router.

2. The method of claim 1, wherein providing the MAC address of the neighbor router to the ND process further comprises the steps of:
    generating an ND message with the MAC address; and
    forwarding the ND message to the ND process.

3. The method of claim 1, wherein providing the MAC address of the neighbor router to the ND process further comprises the steps of:
    calling a function of the ND process to pass the MAC address of the neighbor router to the ND process as an argument.

4. The method of claim 1, wherein updating the RIB or the FIB, further comprises the steps of:
    downloading the MAC address to the RIB by the ND process; and
    downloading the MAC address from the RIB to the FIB.

5. The method of claim 1, wherein updating the L2 forwarding table of the at least one line card, further comprises the step of:
    downloading the MAC address to the L2 forwarding table of the at least one line card by the ND process.

6. The method of claim 3, wherein calling the function of the ND process to pass the MAC address of the neighbor router to the ND process, further comprising the steps of:
    calling the function to add a ND control block with the MAC address.

7. The method of claim 1, further comprising the steps of:
    receiving data traffic at the router with a destination address corresponding to the MAC address; and
    forwarding the data traffic to the next hop using the MAC address.

8. A router executing a process for improved Intermediate System to Intermediate System (IS-IS) protocol and Neighbor Discovery (ND) protocol execution to avoid dropped data traffic caused by Media Access Control (MAC) address resolution for next hops of routes determined by the IS-IS protocol, the router comprising:
    at least one line card including a forwarding information base (FIB), the at least one line card configured to communicate over a link with a neighbor router; and
    a network processor coupled to the at least one line card, the network processor configured to execute an IS-IS module and an ND module,
        the IS-IS module configured to provide an IS-IS process to establish an IS-IS adjacency between the router and the neighbor router over the link, where a MAC address for the neighbor router is received from the neighbor router, the IS-IS process to update a routing information base (RIB) for the router to include the neighbor router as a next hop for at least one destination address, the IS-IS process to provide the MAC address of the neighbor router to an ND process, and
        the ND module configured to provide the ND process to update the RIB, the FIB, or a L2 forwarding table of the at least one line card of the router to include the MAC address of the neighbor router in response to the providing of the MAC address to the ND process thereby obviating a need for the ND process to obtain the MAC address of the neighbor router in response to received data traffic at the router having a next hop to the neighbor router.

9. The router of claim 8, wherein the IS-IS process is configured to provide the MAC address of the neighbor router to the ND process by generating an ND message with the MAC address, and forwarding the ND message to the ND process.

10. The router of claim 8, wherein the IS-IS process is configured to provide the MAC address of the neighbor router to the ND process by calling a function of the ND process to pass the MAC address of the neighbor router to the ND process as an argument.

11. The router of claim 8, wherein the ND process is configured to update the RIB or the FIB by downloading the MAC address to the RIB, and downloading the MAC address from the RIB to the FIB.

12. The router of claim 8, wherein the ND process is configured to update the L2 forwarding tables by downloading the MAC address to the L2 forwarding table of the at least one line card.

13. The router of claim 10, wherein the IS-IS process is configured to call the function of the ND process to pass the MAC address of the neighbor router to the ND process by calling the function to add a ND control block with the MAC address.

14. The router of claim 8, wherein the at least one line card is configured to receive data traffic at the router with a destination address corresponding to the MAC address and forward the data traffic to the next hop using the MAC address.

* * * * *